I. R. COOKSTON.
WATER GLASS SHIELD.
APPLICATION FILED JAN. 16, 1907.
907,465.
Patented Dec. 22, 1908.
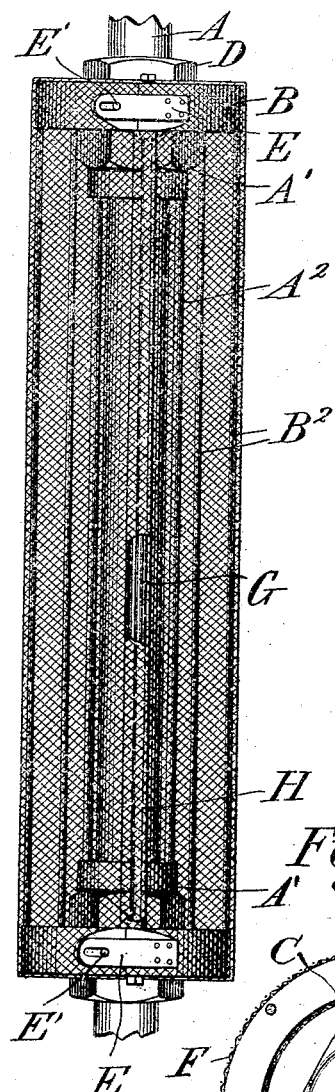
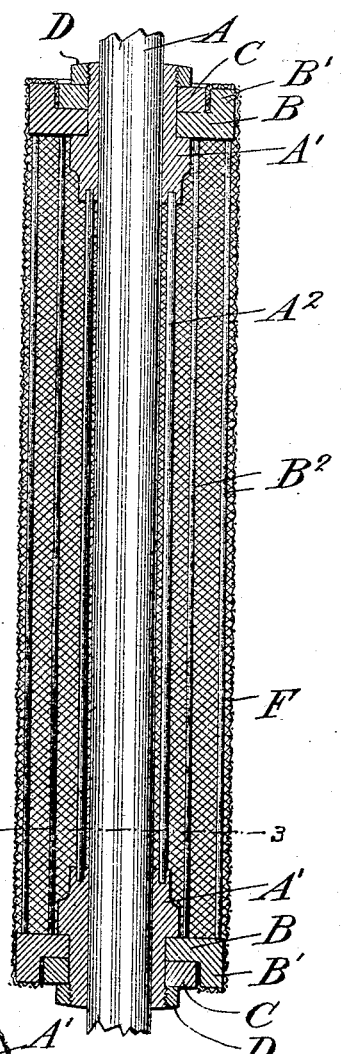
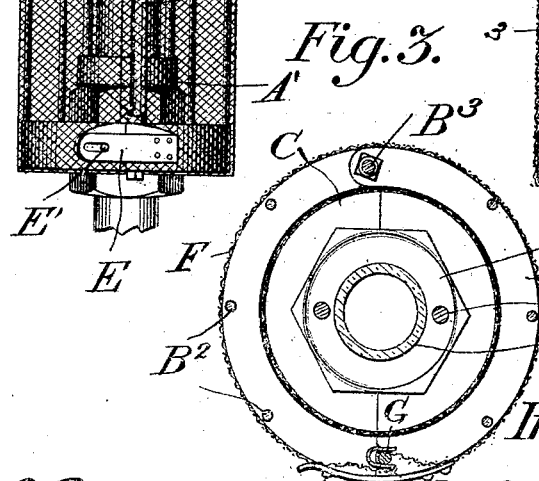
Inventor
Ira R. Cookston.
Witnesses

UNITED STATES PATENT OFFICE.

IRA RUFUS COOKSTON, OF OTTUMWA, IOWA.

WATER-GLASS SHIELD.

No. 907,465.　　　Specification of Letters Patent.　　　Patented Dec. 22, 1908.

Application filed January 16, 1907.　Serial No. 352,596.

*To all whom it may concern:*

Be it known that I, IRA RUFUS COOKSTON, a citizen of the United States, residing at Ottumwa, in the county of Wapello and State of Iowa, have invented a new and useful Improvement in Water-Glass Shields, of which the following is a specification.

This invention relates to a water glass shield and the object of the invention is a shield formed of a netting which incloses the water glass and prevents any injury by reason of the breaking of the glass.

A further object of the invention is a netting held in position about the glass in such manner that it can be readily opened to permit removal of a broken glass and the substitution of a new glass.

The invention consists of hinged collars carried upon the cage of the water tube and a cylindrical net split longitudinally and held in position by the hinged collars.

In the drawings forming a part of this specification:—Figure 1 is a side elevation inclosed by one of my shields. Fig. 2 is a vertical diametrical section through my shield, the water glass being shown in elevation. Fig. 3 is a section on the line 3—3 of Fig. 2, the end of the glass tube being shown in plan.

In these drawings A represents the water glass tube of the ordinary kind, which tube is held adjacent its ends in sleeves A', which sleeves are connected by the rods $A^2$ arranged parallel to the glass A and equi-distant apart. These parts form the water glass and cage in ordinary use. To these parts I apply my shield which is constructed as follows:—Collars B provided with annular oppositely arranged flanges B' are fitted upon the sleeves A' of the glass cage and washers C rest within the flanges B' and bear against the outer faces of the sleeves B, said faces being the upper and lower faces respectively. The washers C are held in place by suitable nuts D, which are threaded upon the sleeves A'. The collars B are held together by rods $B^2$ which are preferably six in number, three being arranged upon each side of the glass A. Both the collars and the washers are split diametrically and the collars of the two sections pivotally connected together by means of a rod $B^3$, shown in section in Fig. 3. Each collar carries a spring catch E, which is riveted to one of the sections of the collar and which is slotted to engage a pin E' carried by the other section. The shield is formed of a cylindrical net F, split longitudinally and the adjacent ends of the net F are firmly held between the vertical rod G which extends from the lower to the upper collar B and a U-shaped bar H which fits over the outer face of the rod G and clamps the edges of the net F. It will also be obvious from the drawings, that the rods $B^2$ not only serve to connect the collars B but also serve as guards arranged within the net F and prevent the net from sagging or curving inwardly and bearing upon the glass A. It will also be understood that the rod G is carried by the collar sections to which the catch E is attached. The U-shaped bar H is carried by the end portions of the other sections, projecting so as to inclose the rod G on three sides when the sections are locked together. The rod H is preferably of brass. It will be obvious therefore, that by springing back the catch E so as to disengage them from the pins E' and by then opening the split collars, by swinging the sections upon their pivot points, the U-shaped bar H will be swung away from the rod G and permit the ready removal of the net. This net is further clamped securely in position by passing its lower and upper end portions over the flanges B' before placing the washers C in position. The upper and lower edges of the net are therefore securely clamped between the edges or sides of the washers C and the inner faces of the flanges B'.

Having thus fully described my invention, what I claim as new and desire to secure by Letters Patent, is:—

1. The combination with a water glass and its cage, of split collars carried by the cage, the sections of the collars being pivoted together, a net carried by the collars, and means carried by the collars for clamping the edges of the net.

2. The combination with a water glass and its cage, of collars formed of pivoted sections and carried by the cage, a net substantially cylindrical in form and split longitudinally, means carried by the collars for clamping the longitudinal edges of the net, and means carried by the cage for clamping the upper and lower edges of the net against the collars, respectively.

3. A device of the kind described comprising upper and lower collars, formed in sections and pivoted together, said collars being flanged, washers fitting within the flanges and a net fitting over the collars and having its ends held between the flanges and the washers.

4. The combination with a water glass tube, flanged collars fitting over the tube, each of said collars being formed in sections pivoted together, catches carried by the collars for locking the sections together, the said collars being flanged, split washers arranged upon the collars within the flanges, means for locking the said washers in position and a cylindrical net having its ends caught between the washers and the flanges of the collars, said net fitting over and extending from one collar to the other.

5. A device of the kind described comprising collars spaced apart each of which consists of two pivoted sections, a rod carried by one section of each collar, a U-shape bar carried by the other section in position to fit over and partially inclose said rod, a cylindrical net fitting over the collars, the net being split longitudinally, the edges of the net being normally held between the rod and the bar, and means for clamping the upper and lower ends of the nets to the collars respectively.

IRA RUFUS COOKSTON.

Witnesses:
E. C. Moss,
M. C. Douglass.